United States Patent [19]
Mead

[11] 3,754,638
[45] Aug. 28, 1973

[54] CONVEYOR JUNCTION
[75] Inventor: Dennis E. Mead, Cazenovia, N.Y.
[73] Assignee: Lipe Rollway Corporation,
Liverpool, N.Y.
[22] Filed: Apr. 27, 1972
[21] Appl. No.: 247,966

[52] U.S. Cl............................................. 198/220 A
[51] Int. Cl.............................................. B65g 27/06
[58] Field of Search ................. 198/220 A, 220 BA,
198/220 BB, 82; 46/1 C

[56] References Cited
UNITED STATES PATENTS
3,667,590   6/1972   Mead............................ 198/220 BA

*Primary Examiner*—Edward A. Sroka
*Attorney*—Cumpston, Shaw & Stephens

[57] ABSTRACT

A conveyor junction joins two or more vibrator-powered conveyor modules having feed surfaces covered with pile inclined toward the direction of feed. The modules are pivotally joined with their feed surfaces at approximately the same height and so that each module is free to vibrate. A circular transfer surface is disposed between the feed surfaces of the joined modules concentric with the pivotal joint, and the transfer surface has pile inclined toward the direction of feed of a receiving module.

17 Claims, 7 Drawing Figures

Patented Aug. 28, 1973

3,754,638

3,754,638

CONVEYOR JUNCTION

THE INVENTIVE IMPROVEMENT

There is a need for portable conveyors for moving objects about in manufacturing or assembly operations, and several conveyors have been built to meet such needs. The invention recognizes a way that portable conveyors can be made more convenient, versatile, and easier to set up in any desired configuration. The invention involves a junction arrangement especially suited to vibratory pile conveyors, and aims at versatility, convenience, efficiency, reliability and economy in assembling and operating vibratory pile conveyor modules.

SUMMARY OF THE INVENTION

The inventive conveyor junction uses at least two portable vibratory conveyor modules having longitudinal feed surfaces covered with pile inclined toward the direction of feed. The modules are pivotally joined together with their feed surfaces at approximately the same height in the region of the junction, and the joining means is arranged to allow vibration of the joined modules. A transfer surface between the feed surfaces of the joined modules is circular and concentric with the pivotal joining means. The transfer surface has pile inclined toward the direction of feed of a receiving one of the modules, and the transfer surface is vibrated for moving objects from one module to another.

DRAWINGS

DETAILED DESCRIPTION

Figure 1:
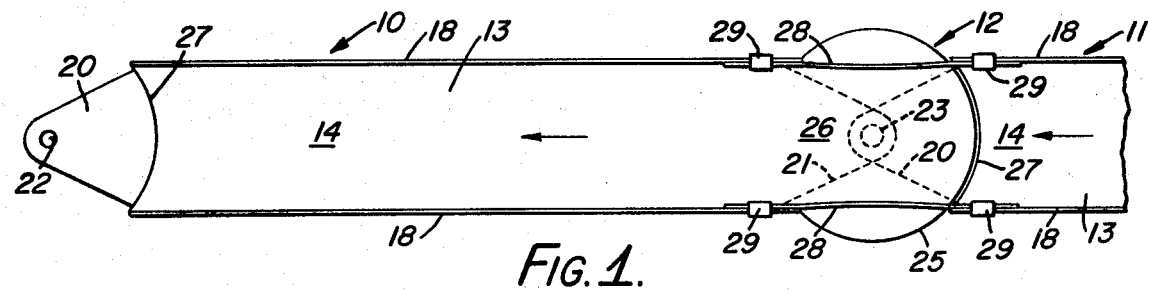
FIG. 1 is a plan view of a preferred embodiment of the inventive conveyor junction between a pair of conveyor modules.
Figure 2:
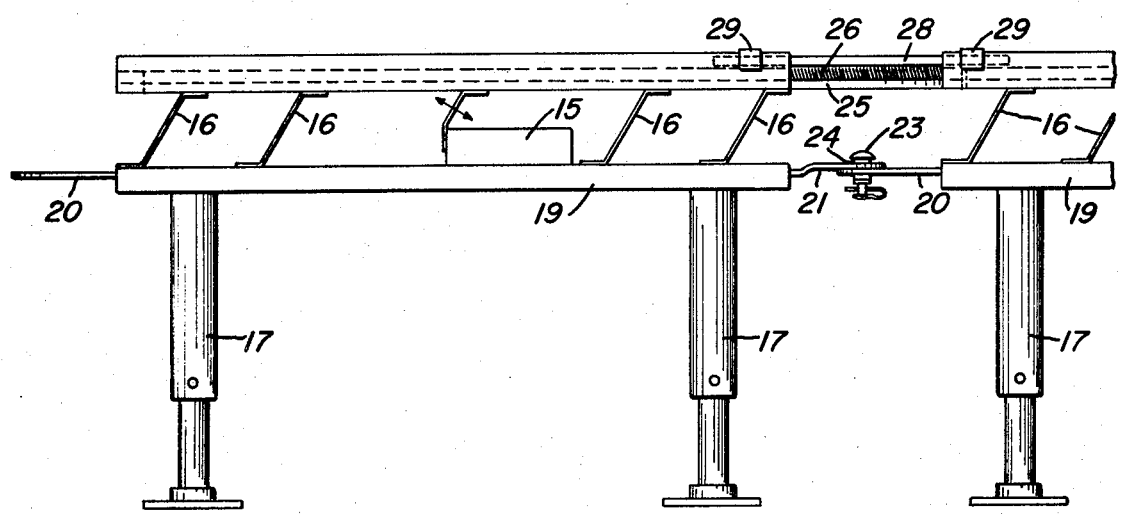
FIG. 2 is a side elevational view of the junction of FIG. 1.

Conveyor modules 10 and 11 of FIGS. 1 and 2 are joined together in a junction 12 so that objects are fed from module 11 through junction 12 and along module 10. Modules 10 and 11 each have longitudinal feed surfaces 13 that are covered with a pile material 14 that is inclined toward the direction of feed as indicated by the arrows. Feed surfaces 13 are supported by springs 16 so that a vibrator 15 drives feed surfaces 13 in a vibration that cooperates with inclined pile 14 for feeding objects in the direction of the arrows. Modules 10 and 11 have adjustable legs 17 and side rails 18 extending above pile 14 along the sides of feed surfaces 13.

The bases 19 of modules 10 and 11 carry plates 20 at the delivering end of the module and plates 21 at the receiving end of the module for pivotally connecting modules together. When modules 10 and 11 are moved into an end-to-end relationship as illustrated, plates 20 and 21 overlap and register their holes 22. Then a pin 23, preferably having an elastomeric bushing 24, is fitted in holes 22 for pivotally joining plates 20 and 21 together. Pin 23 can also have a loose fit in hole 22, or some other flexible coupling can be used to allow modules 10 and 11 to vibrate freely even though connected together. Vibrators 15 of adjacent modules 10 and 11 are preferably operated in phase for minimizing vibrational motion of one module relative to another. Modules 10 and 11 can be pivoted to any desired angular setting around pin 23 or some other pivotal coupling, so that a desired feed path can be established from module-to-module for the movement of objects.

A transfer surface 25 that is circular in shape and concentric with pin 23 is disposed between the feed surfaces 13 of modules 10 and 11 as illustrated. In the relatively simple embodiment illustrated in FIGS. 1 and 2, transfer surface 25 is preferably an integral extension of receiving end of the feed surface 13 of module 10, and transfer surface 25 is covered with pile 26 inclined toward the direction of feed of module 10. Transfer surface 25 then vibrates with module 10 so that pile 26 feeds objects in the direction of feed surface 13 of module 10.

Transfer surface 25 preferably has a diameter substantially larger than the width of feed surfaces 13 so that module 11 can be pivoted around transfer surface 5 through a substantial arc. This gives a relatively wide angular freedom to junction 12, and it also allows more than one delivering module to be connected to a single receiving module around a transfer surface 25. The delivering ends 27 of modules 10 and 11 preferably have a curvature 27 shaped to fit transfer surface 25 so that objects can flow smoothly from the feed surface 13 of a delivering module onto transfer surface 25 of a receiving module at any regular setting between the modules.

A flexible connection between side rails 18 of joined modules 10 and 11 is preferred for convenience in setting up modules as desired. A simple way of achieving this is by flexible strips 28 that are secured to side rails 18 by clips 29 to extend flexibly across transfer surface 25. Strips 28 can be adjusted under clips 29 quickly to form suitable guide rails for any angular setting of modules 10 and 11.

Figure 3:
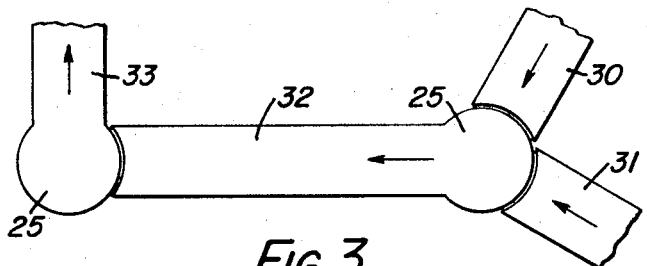
FIGS. 3–5 are partially schematic plan views of alternative preferred embodiments of the inventive conveyor junction.

FIG. 3 schematically shows two delivering modules 30 and 31 joined to a single receiving module 32 having a fixed transfer surface 25 such as described above for module 10. Modules 30 and 31 each deliver objects onto transfer surface 25 for feeding along module 32 which in turn delivers objects onto another transfer surface 25 for feeding along another receiving module 33. Three delivering modules can be connected to transfer surface 25 for three inputs to a single receiving module, and by enlarging the diameter of transfer surface 25, even more delivering modules can be connected to a single receiving module.

Figure 4:
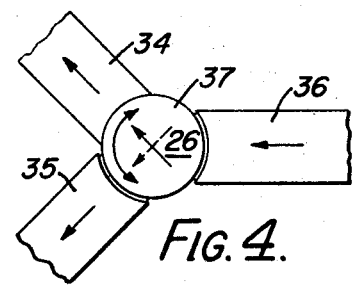

Receiving module 34 of FIG. 4 carries a transfer surface 37 formed as a rotatable disk so that the inclined pile 26 on disk 37 can be rotated to different directions of feed as suggested by the arrows. Then a delivering module 36 and another receiving module 35 can be pivotally connected to receiving module 34, and disk 37 can be rotated to aim pile 26 at either module 34 or 35 for selectively feeding the output of delivering module 36 as desired.

Rotation of disk 37 could be manual or automatic, depending upon the need for alternating the flow between modules 34 and 35. For example, a feedback mechanism detecting a jam-up of objects downstream from one of the modules 34 or 35 could automatically shift disk 37 to feed to the alternative receiving module. Manual adjustment of disk 37 could be made by an operator to direct object flow as desired, and three or more receiving modules could be fed by transfer disk 37.

Figure 5:
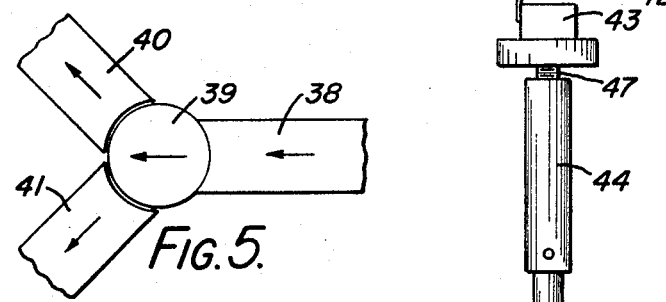

An alternative arrangement shown in FIG. 5 uses a rotatable transfer disk 39 carried by and vibrated by a delivering module 38. A pair of alternative receiving modules 40 and 41 are pivotally connected to delivery module 38 concentric with rotatable disk 39 which is turned as desired to direct the flow from module 38 onto either module 40 or 41. Generally, if a transfer disk is carried by a delivering module, it is preferably rotatable so that its inclined pile can be aimed in the direction of a receiving module.

Figure 6:
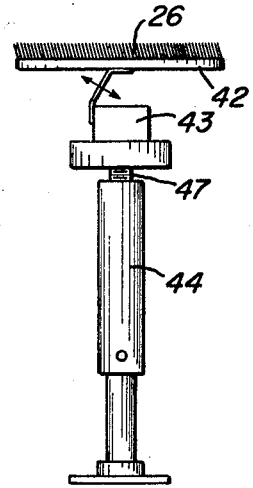
FIG. 6 is an elevational view of a transfer device for use in the inventive conveyor junction.
Figure 7:
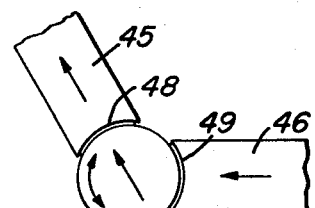
FIG. 7 is a partially schematic, plan view of the transfer device of FIG. 6 assembled into a conveyor junction.

FIGS. 6 and 7 show a separately supported transfer disk 42 driven by a separate vibrator 43 mounted on an independent support stand 44. Disk 42 is rotatable on or with stand 44 to direct its inclined pile 26 toward the direction of flow of a receiving module 45 as illustrated in FIG. 7. Delivering module 46 and receiving module 45 are pivotally connected concentrically with disk 42 and preferably around a pin 47, and the ends 48 and 49 of modules 45 and 46 are each curved to fit transfer disk 42. Different delivering and receiving modules can be connected around disk 42 as desired, and disk 42 can be rotated to establish any desired direction of feed.

By use of the simple conveyor junction of the invention, many identical modules can be joined together quickly and conveniently in an infinite number of patterns and arrangements for feeding objects about in any way desired. This eliminates the need for different lengths or sizes of conveyors, does not require objects to drop from one conveyor down into the trough of another, and is generally simple, efficient and economical.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand how to adapt the inventive conveyor junction to any particular feeding job.

I claim:
1. A conveyor junction comprising:
  a. at least two portable vibratory conveyor modules having longitudinal feed surfaces covered with pile inclined toward the direction of feed;
  b. means for pivotally joining said modules with said feed surfaces at approximately the same height in the region of said junction;
  c. said joining means being arranged to allow vibration of said joined modules;
  d. a transfer surface disposed between said feed surfaces of said joined modules;
  e. said transfer surface being circular and concentric with said pivotal joining means;
  f. said transfer surface having pile inclined toward said direction of feed of a receiving one of said modules; and
  g. means for vibrating said transfer surface.

2. The conveyor junction of claim 1 wherein said transfer surface has a diameter substantially larger than the width of said feed surfaces.

3. The conveyor junction of claim 1 wherein said pivotal joining means includes a flexible coupling.

4. The conveyor junction of claim 3 wherein said flexible coupling includes an elastomeric bushing.

5. The conveyor junction of claim 1 including means for vibrating said joined modules in phase with one another.

6. The conveyor junction of claim 1 wherein a plurality of delivering ones of said modules are joined to said receiving module.

7. The conveyor junction of claim 1 wherein a plurality of said receiving modules are joined to a delivering one of said modules.

8. The conveyor junction of claim 7 wherein said transfer surface comprises a disk rotatable for aligning said pile of said transfer surface with a selected one of said receiving modules.

9. The conveyor junction of claim 1 wherein said conveyor modules have side rails, and including guide means connecting said side rails of said joined modules across said transfer surface.

10. The conveyor junction of claim 9 wherein said guide means comprises flexible strips and clips for securing said flexible strips to said guide rails.

11. The conveyor junction of claim 1 including means for supporting and vibrating said transfer surface independently of said modules.

12. The conveyor junction of claim 11 wherein said feed surfaces are curved to fit said transfer surface.

13. The conveyor junction of claim 1 including means for supporting said transfer surface on one of said vibrating modules.

14. The conveyor junction of claim 13 wherein said transfer surface comprises a rotatable disk carried on a delivering one of said modules, and said feed surface of said receiving one of said modules is curved to fit said transfer surface.

15. The conveyor junction of claim 13 wherein said transfer surface is carried on said receiving module and said feed surface of a delivering one of said modules is curved to fit said transfer surface.

16. The conveyor junction of claim 15 wherein said transfer surface is formed as an integral extension of said feed surface of said receiving module.

17. The conveyor junction of claim 16 wherein said transfer surface has a diameter substantially larger than the width of said feed surfaces.

* * * * *